United States Patent
Tachimori

(10) Patent No.: US 8,326,597 B2
(45) Date of Patent: Dec. 4, 2012

(54) TRANSLATION APPARATUS, METHOD, AND COMPUTER PROGRAM PRODUCT FOR DETECTING LANGUAGE DISCREPANCY

(75) Inventor: Mitsuyoshi Tachimori, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 538 days.

(21) Appl. No.: 12/560,615

(22) Filed: Sep. 16, 2009

(65) Prior Publication Data
US 2010/0198578 A1 Aug. 5, 2010

(30) Foreign Application Priority Data
Jan. 30, 2009 (JP) ................................. 2009-020450

(51) Int. Cl.
*G06F 17/28* (2006.01)
(52) U.S. Cl. ..................................... 704/2; 704/3; 704/7
(58) Field of Classification Search ................ 704/2, 3, 704/8, 9
See application file for complete search history.

(56) References Cited

U.S. PATENT DOCUMENTS

| | | | | |
|---|---|---|---|---|
| 6,092,036 | A * | 7/2000 | Hamann | 704/8 |
| 6,275,789 | B1 * | 8/2001 | Moser et al. | 704/7 |
| 2002/0111788 | A1 * | 8/2002 | Kimpara | 704/2 |
| 2003/0097250 | A1 * | 5/2003 | Chino | 704/1 |
| 2003/0125927 | A1 * | 7/2003 | Seme | 704/3 |
| 2003/0149557 | A1 * | 8/2003 | Cox et al. | 704/2 |
| 2004/0102957 | A1 * | 5/2004 | Levin | 704/3 |
| 2004/0199373 | A1 * | 10/2004 | Shieh | 704/2 |
| 2005/0131673 | A1 * | 6/2005 | Koizumi et al. | 704/2 |
| 2006/0217964 | A1 * | 9/2006 | Kamatani et al. | 704/7 |
| 2006/0271350 | A1 * | 11/2006 | Chino et al. | 704/2 |
| 2006/0282269 | A1 * | 12/2006 | Galison | 704/277 |
| 2007/0118351 | A1 * | 5/2007 | Sumita | 704/2 |
| 2007/0124132 | A1 * | 5/2007 | Takeuchi | 704/9 |
| 2008/0077393 | A1 * | 3/2008 | Gao et al. | 704/8 |
| 2008/0177528 | A1 * | 7/2008 | Drewes | 704/2 |
| 2009/0210214 | A1 * | 8/2009 | Qian et al. | 704/2 |
| 2009/0222257 | A1 * | 9/2009 | Sumita et al. | 704/3 |

FOREIGN PATENT DOCUMENTS

| | | |
|---|---|---|
| JP | 07-160715 | 6/1995 |
| JP | 2002-007392 | 1/2002 |
| JP | 2003-527676 | 9/2003 |
| WO | 01-35249 A3 | 5/2001 |

* cited by examiner

*Primary Examiner* — Jialong He
(74) *Attorney, Agent, or Firm* — Turocy & Watson, LLP

(57) ABSTRACT

A setting unit sets an input language and an output language, a first receiving unit receives input data in a language, a storage unit stores the input data, a detection unit detects a discrepancy between the input language and the language of the input data, a swapping unit swaps the settings of the input language and the output language if the discrepancy is detected, a recognition unit recognizes the input data from the storage unit in the input language set by the setting unit if the discrepancy is not detected, and recognizes the input data read from the storage unit in the input language swapped by the swapping unit if the discrepancy is detected, and a translation unit translates a recognition result recognized in the input language set by the setting unit into the set output language if the discrepancy is not detected, and translates the recognition result recognized in the input language swapped by the swapping unit into the output language swapped by the swapping unit if the discrepancy is detected.

10 Claims, 9 Drawing Sheets

TRANSLATION APPARATUS, METHOD, AND COMPUTER PROGRAM PRODUCT FOR DETECTING LANGUAGE DISCREPANCY

CROSS-REFERENCE TO RELATED APPLICATIONS

This application is based upon and claims the benefit of priority from the prior Japanese Patent Application No. 2009-020450, filed on Jan. 30, 2009; the entire contents of which are incorporated herein by reference.

BACKGROUND OF THE INVENTION

1. Field of the Invention

The present invention relates to a translation apparatus, a method, and a computer program product.

2. Description of the Related Art

Conventionally, a translation apparatus which translates for users having different mother tongues bi-directionally while inputting user sets his or her own mother tongue as an input language and the other's mother tongue as an output language is known (for example, JP-A 2002-7392 (KOKAI)). In such a translation apparatus, the settings of input language and output language have to be swapped frequently.

Also, there is a translation apparatus which automatically recognizes a language of data that are input in the translation apparatus based on the data and performs translation without the user interchanging input language and output language (for example, JP-A 07-160715 (KOKAI) and JP-A 2003-527676 (KOHYO)).

By the way, when using a translation apparatus as disclosed in JP-A 2002-7392 (KOKAI), if the user forgets to swap the settings of input language and output language, or the user inputs data in a situation in which his or her mother tongue is not set to the input language and/or the other's mother tongue is not set to the output language due to an operational mistake, the language of the input data and the set input language do not mach, so that the translation result is incomprehensible.

In such a case, if the user resets the input language to be his or her own mother tongue and the output language to the other's mother tongue and then input the same data again, a time is wasted and an extra burden is placed on the user.

In addition, even the translation apparatus as disclosed in JP-A 07-160715 (KOKAI) or JP-A 2003-527676 (KOHYO), which automatically recognizes a language of input data by a language recognition function without a user swapping an input language and an output language, does not always recognize the language correctly, and thus, time waste or burden on the user may be even increased.

SUMMARY OF THE INVENTION

According to an aspect of the present invention, a translation apparatus includes a setting unit configured to set an input language and an output language; a first receiving unit configured to receive input data in a language, which is speech or character information; a storage unit configured to store the input data; a detection unit configured to detect a discrepancy between the input language and the language of the input data; a swapping unit configured to swap the settings of the input language and the output language if the discrepancy is detected; a reading unit configured to read the input data from the storage unit; a recognition unit configured to recognize the input data from the storage unit in the input language set by the setting unit if the discrepancy is not detected, and recognize the input data from the storage unit in the input language swapped by the swapping unit if the discrepancy is detected; and a translation unit configured to translate a recognition result recognized in the input language set by the setting unit into the output language set by the setting unit if the discrepancy is not detected, and translate a recognition result recognized in the input language swapped by the swapping unit into the output language swapped by the swapping unit if the discrepancy is detected.

According to another aspect of the present invention, a translation method includes setting an input language and an output language; receiving input data in a language, which is speech or character information; storing the input data into a storage unit; detecting a discrepancy between the input language and the language of the input data; swapping the settings of the input language and the output language if the discrepancy is detected; reading the input data stored in the storage unit; recognizing the input data from the storage unit in the input language set at the setting if the discrepancy is not detected, and recognizing the input data from the storage unit in the input language swapped at the swapping if the discrepancy is detected; and translating a recognition result recognized in the input language set at the setting into the output language set at the setting if the discrepancy is not detected, and translating the recognition result recognized in the input language swapped at the swapping into the output language swapped at the swapping if the discrepancy is detected.

According to still another aspect of the present invention, a computer program product having a computer readable medium including programmed instructions. The instructions, when executed by a computer, cause the computer to perform setting an input language and an output language; receiving input data in a language, which is speech or character information; storing the input data into a storage unit; detecting a discrepancy between the input language and the language of the input data; swapping the settings of the input language and the output language if the discrepancy is detected; reading the input data stored in the storage unit; recognizing the input data from the storage unit in the input language set at the setting if the discrepancy is not detected, and recognizing the input data from the storage unit in the input language swapped at the swapping if the discrepancy is detected; and translating a recognition result recognized in the input language set at the setting into the output language set at the setting if the discrepancy is not detected, and translating the recognition result recognized in the input language swapped at the swapping into a output language swapped at the swapping if the discrepancy is detected.

DETAILED DESCRIPTION OF THE INVENTION

Hereinafter, preferred embodiments of a translation apparatus, a method, and a computer program product according to the present invention will be described with reference to the accompanying drawings. Although, in the embodiments below, a case in which a translation from English to Japanese and a translation from Japanese to English are performed in a bidirectional direction will be described as an example, the translation mode is not limited to this and the invention can be applied to bidirectional translations between various languages.

First, the overview and configuration of the translation apparatus of a first embodiment will be described.

Figure 1:
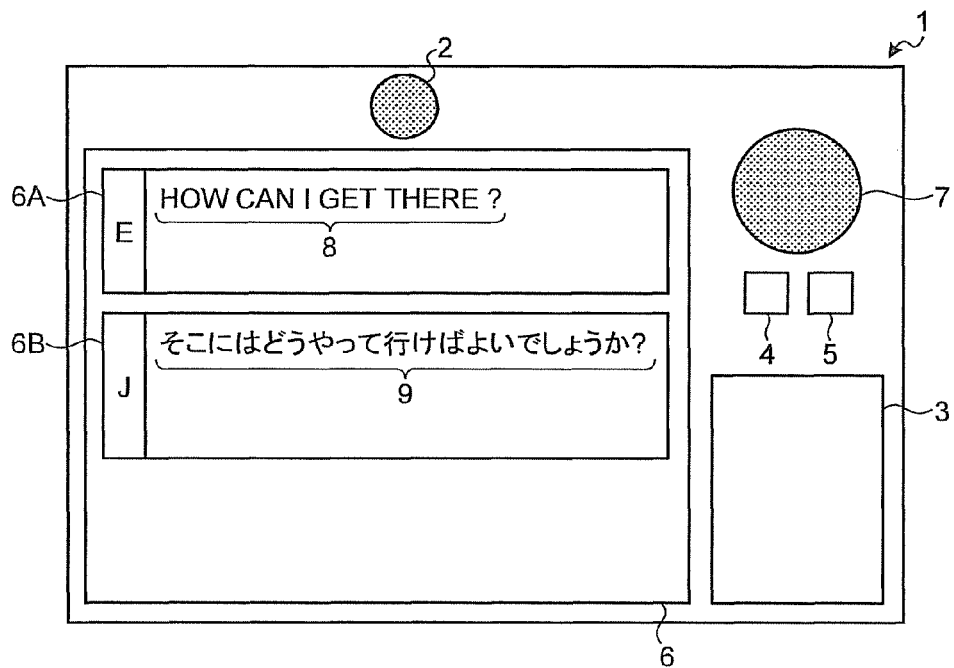
FIG. 1 is a schematic view illustrating an example of an appearance of a translation apparatus of a first embodiment.

FIG. 1 is a schematic view illustrating an example of the appearance of a translation apparatus 1 of the first embodiment. As illustrated in FIG. 1, the translation apparatus 1 is a mobile type terminal and includes a microphone 2, a touch panel 3, a wrong setting notification button 4, a language swapping button 5, displays 6A and 6B, and a speaker 7.

The microphone 2 is for receiving a user's speech. The touch panel 3 is used for inputting character information that a user writes using a pointing device such as a touch pen.

The wrong setting notification button 4 is for notifying that the language of the input data such as speech that is input through the microphone 2 or the character information that is input through the touch panel 3 is different from the language used for recognizing the input data, in other words, notifying the wrong setting of the input language, when the user presses the button. The language swapping button 5 is for swapping the settings of the input language and the output language used for translating the input data when the user presses the button.

The display 6 is for display output of a translation result from the input language to the output language or the like. In the first embodiment, the display 6 displays the recognition result, which is a result of recognizing the input data, in the input language on a first display area 6A, and displays the translation result, which is a result of translating the recognition result into the output language, in a second display area 6B. The speaker 7 is for audio-outputting the translation result, which is a result of translating from the input language to the output language, or the like.

In the example illustrated in FIG. 1, appearances of main input/output devices in the translation apparatus 1 only are illustrated. In addition to the above, the translation apparatus 1 includes various operation buttons and a keyboard (not illustrated in the figures) for language setting operations in which both of the input language and the output language are set, a speech inputting notification operation which notifies that a speech is being input, an end operation which ends the translation, and the like.

In the first embodiment, although the translation apparatus 1 includes the microphone 2 and the touch panel 3 for receiving data, the translation apparatus 1 may include only one of them. Similarly, although the translation apparatus 1 includes the display 6 and the speaker 7 for outputting the translation result or the like, the translation apparatus 1 may include only one of them.

The translation apparatus 1 of the first embodiment is for users having different mother tongues from each other to communicate each other utilizing the translation results by inputting data while swapping the languages by pressing the language swapping button 5 so that inputting user's mother tongue is set to the input language and the other user's mother tongue is set to the output language.

If a user forgets to press the language swapping button 5, or the user inputs data when his or her mother tongue is not set to the input language and/or the other user's mother tongue is not set to the output language due to wrong operational, the translation result is incomprehensible, so that the communication is impossible.

In such a case, if translation in a situation in which his or her mother tongue is set to the input language and the other user's mother tongue is set to the output language is possible without a need for an input user to press the language swapping button 5 to reset the setting so that his or her mother tongue is set to the input language and the other user's mother tongue is set to the output language and then to input the input data again, usability can be improved.

Therefore, when the user presses the wrong setting notification button 4, the translation apparatus 1 of the first embodiment swaps the settings of the input language and the output language, recognizes and translates the input data having been input, by using the settings after the swapping to output a translation result.

Figure 2:
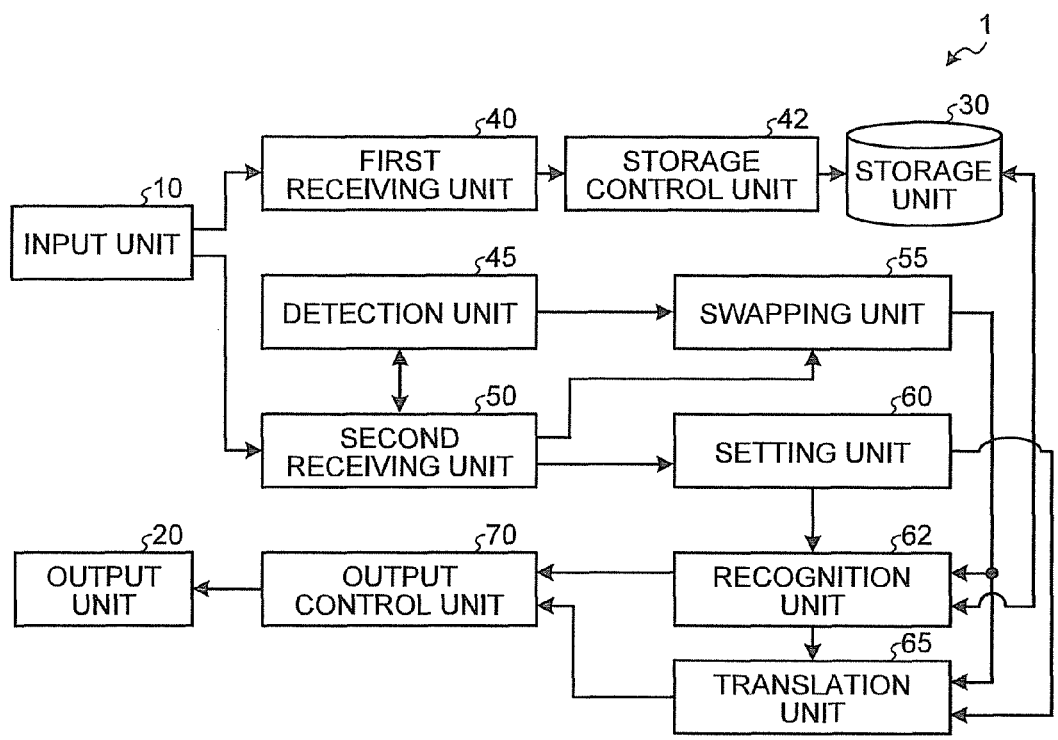
FIG. 2 is a block diagram illustrating an example of a configuration of the translation apparatus of the first embodiment.

FIG. 2 is a block diagram illustrating an example of a configuration of the translation apparatus 1 of the first embodiment. As illustrated in FIG. 2, the translation apparatus 1 includes an input unit 10, an output unit 20, a storage unit 30, a first receiving unit 40, a storage control unit 42, a detection unit 45, a second receiving unit 50, a swapping unit 55, a setting unit 60, a recognition unit 62, a translation unit 65, and an output control unit 70.

The input unit 10 is for receiving a speech, character information, and various operations, and the like, and, for example, the input unit 10 can be realized by existing input devices such as the microphone 2, the touch panel 3, the wrong setting notification button 4, and the language swapping button 5 illustrated in FIG. 1.

The output unit 20 is for outputting a translation result or the like, and, for example, the output unit 20 can be realized by existing output devices such as the display 6 and the speaker 7 illustrated in FIG. 1.

The storage unit 30 is for storing information used for various processing in the translation apparatus 1, and, for example, the storage unit 30 can be realized by existing storage mediums such as a Hard Disk Drive (HDD), an optical disk, a memory card, and a Random Access Memory (RAM).

The first receiving unit 40 receives the input data which is speech or character information from the input unit 10.

Specifically, when the first receiving unit 40 receives a speech input through the microphone 2, the first receiving unit 40 samples an input analog signal and converts it into a digital signal. To convert into a digital signal, for example, an existing technique such as A/D conversion can be used.

When the first receiving unit 40 receives character information through the touch panel 3, the first receiving unit 40 detects positions pointed on the touch panel 3 (positions touched by a touch pen or the like) at a predetermined interval.

The storage control unit 42 stores the input data received by the first receiving unit 40 into the storage unit 30. Specifically, if the input data is a speech, the storage control unit 42 stores the digital signal converted by the first receiving unit 40 into the storage unit 30, and if the input data is the character information, the storage control unit 42 stores the pointed positions detected by the first receiving unit 40 into the storage unit 30.

The detection unit 45 detects a discrepancy between the language of the input data and the input language used for recognizing the input data. Specifically, the detection unit 45 detects the discrepancy between the language of the input data and the input language by detecting that the second receiving unit 50 to be described below receives an input of a wrong setting notification operation which notifies of a wrong setting of the input language from the wrong setting notification button 4 after the input of the input data is started.

The second receiving unit 50 receives the operation information from the input unit 10. Specifically the second receiving unit 50 receives an input of a wrong setting notification operation through the wrong setting notification button 4, an input of a language swapping operation for swapping the settings of the input language and the output language through the language swapping button 5, and an inputs such as a language setting operation, a speech inputting notification operation, an end operation, and the like through various operation buttons and the keyboard not illustrated in the figures.

The setting unit 60 sets the input language and the output language. Specifically, the setting unit 60 sets the input language and the output language to specified languages, respectively, when an input of the language setting operation is received by the second receiving unit 50.

The swapping unit 55 swaps the settings of the input language and the output language used for translating the input data when a discrepancy between the language of the input data and the input language is detected by the detection unit 45.

For example, when the input language is set to Japanese and the output language is set to English, the swapping unit 55 switches the setting of input language from Japanese to English and the setting of output language from English to Japanese. Or alternatively, for example, when the input language is set to English and the output language is set to Japanese, the swapping unit 55 switches the setting of input language from English to Japanese and the setting of output language from Japanese to English.

Also, the swapping unit 55 swaps the settings of the input language and the output language when an input of the language swapping operation is received by the second receiving unit 50.

The recognition unit 62 reads the input data stored in the storage unit 30, and if the swapping by the swapping unit 55 is not performed, the recognition unit 62 recognizes the read input data in the input language set by the setting unit 60, and generates character strings of the recognized input data.

The recognition unit 62 reads the input data stored in the storage unit 30, and if the swapping by the swapping unit 55 has been performed, the recognition unit 62 recognizes the read input data in the input language swapped by the swapping unit 55, and generates character strings of the recognized input data.

If the discrepancy is detected by the detecting unit 45 after the translation of the recognition result that is the character strings generated by the recognition unit 62 is started by the translation unit 65 to be described below, and the settings of the input language and the output language have been swapped by the swapping unit 55, the recognition unit 62 reads the input data again from the storage unit 30 and recognizes the read input data in the input language swapped by the swapping unit 55.

When the input data is a speech, to generate character strings of the recognized input data, existing speech recognition methods such an LPC analysis, a Hidden Markov Model (HMM), a dynamic programming, a neural network, an N-gram language model, for example can be used.

When the input data is character information, to generate character strings of the recognized input data, existing character recognition methods such as HMM, for example can be used.

Dictionary data used for speech recognition, pattern data used for character recognition, and the like are stored in the storage unit 30 for each language.

If the swapping is not performed by the swapping unit 55, the translation unit 65 translates the recognition result by the recognition unit 62 into the output language set by the setting unit 60, and if the swapping has been performed by the swapping unit 55, the translation unit 65 translates the recognition result by the recognition unit 62 into the output language swapped by the swapping unit 55.

For the translation, existing translation methods such as an example-based method, a transfer method, a statistics based method, for example can be used, and dictionary data or the like used for translation is stored in the storage unit 30 for each language.

The output control unit 70 outputs the translation result or the like to the output unit 20. For example, the output control unit 70 displays the recognition result on the first display area 6A of the display 6, and displays the translation result on the second display area 6B of the display 6. In the example illustrated in FIG. 1, since the input language is set to English and the output language is set to Japanese, the output control unit 70 displays English character strings 8 that is the recognition result along with a character "E" indicating English on the first display area 6A, and displays Japanese character strings 9 that is the translation result along with a character "J" indicating Japanese on the second display area 6B.

When the settings of the input language and the output language are swapped by the swapping unit 55, the output control unit 70 displays Japanese character strings that is the recognition result along with a character "J" indicating Japanese on the first display area 6A, and displays English character strings that is the translation result along with a character "E" indicating English on the second display area 6B.

For example, the output control unit 70 performs a speech synthesis processing which converts the translation result into a speech signal, and DA converts the speech signal generated by the speech synthesis processing and audio-outputs the converted signal through the speaker 7. For the speech synthesis processing, existing methods such as a speech piece editing speech synthesis, a formant speech synthesis, a speech corpus based speech synthesis, for example, can be used.

Next, an operation of the translation apparatus of the first embodiment will be described.

Figure 3:
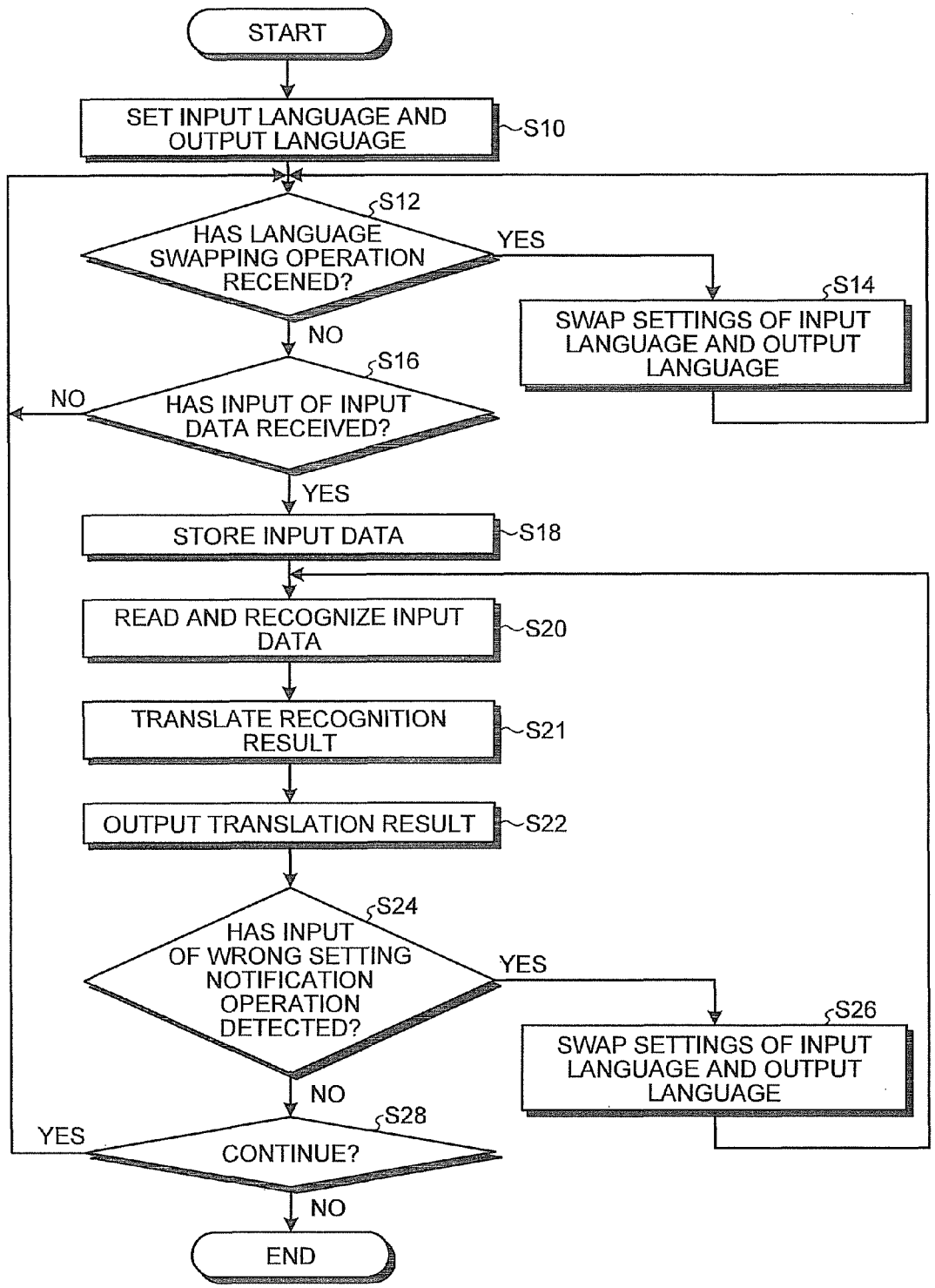
FIG. 3 is a flowchart illustrating an example of a translation processing procedure performed by the translation apparatus of the first embodiment.

FIG. 3 is a flowchart illustrating an example of a translation processing procedure performed by the translation apparatus 1 of the first embodiment. In the example illustrated in FIG. 3, although a case in which an input of the wrong setting notification operation is detected through the wrong setting notification button 4 after the translation result is output will be described as an example, the timing of detecting the input of the wrong setting notification operation is not limited to this, and may be any timing.

The setting unit 60 sets the input language and the output language to specified languages respectively, as initial settings when an input of the language setting operation is received by the second receiving unit 50 (step S10).

The second receiving unit 50 checks whether or not the input of the language swapping operation through the language swapping button 5 is performed (step S12).

If the second receiving unit 50 receives the input of the language swapping operation (Yes at step S12), the swapping unit 55 swaps the settings of the input language and the output language (step S14).

On the other hand, if the second receiving unit 50 does not receive the input of the language swapping operation (No at step S12), the first receiving unit 40 checks whether or not an input of the input data is performed through the microphone 2 or the touch panel 3 (step S16).

If the input of the input data is received by the first receiving unit 40 (Yes at step S16), the storage control unit 42 discards data having been stored in the storage unit 30 (initializes) and stores the input data received by the first receiving unit 40 in the storage unit 30 (step S18).

On the other hand, if the input of the input data is not received by the first receiving unit 40 (No at step S16), or if the settings of the input language and the output language are swapped by the swapping unit 55 (step S14), the second receiving unit 50 checks again whether or not the input of the language swapping operation is performed through the language swapping button 5 (to step S12).

The recognition unit 62 reads the input data stored in the storage unit 30, and recognizes the read input data in the input language (step S20).

The translation unit 65 translates the recognition result by the recognition unit 62 into the output language (step S21).

The output control unit 70 outputs the translation result to the output unit 20 (step S22).

The detection unit 45 checks whether or not the input of the wrong setting notification operation through the wrong setting notification button 4 is received by the second receiving unit 50 (step S24).

If the detection unit 45 detects that the input of the wrong setting notification operation is received by the second receiving unit 50, and thus detects a discrepancy between the language of the input data and the input language (Yes at step S24), the swapping unit 55 swaps the settings of the input language and the output language (step S26).

Thereafter, the recognition unit 62 reads again the input data stored in the storage unit 30, and recognizes the read input data in the input language swapped by the swapping unit 55 (step S20). The translation unit 65 translates the recognition result into the output language (step S21), and the output control unit 70 outputs the translation result to the output unit 20 (step S22).

On the other hand, if the detection unit 45 does not detect a discrepancy between the language of the input data and the input language (No at step S24), the second receiving unit 50 checks the input of the end operation and determines whether the process should be continued or not (at step S28).

If the second receiving unit 50 does not receive the input of the end operation (Yes at step S28), the second receiving unit 50 checks again whether or not the input of the language swapping operation is performed through the language swapping button 5 (to step S12).

On the other hand, if the second receiving unit 50 receives the input of the end operation (No at step S28), the process is ended.

As described above, when a user presses the wrong setting notification button 4, the translation apparatus of the first embodiment swaps the settings of the input language and the output language, reads the stored input data, recognizes the read input data in the input language swapped by the swapping unit 55, and translates the recognized input data into the output language swapped by the swapping unit 55. Therefore, according to the first embodiment, even when the setting of the input language is wrong, the user only has to press the wrong setting notification button 4, and the user need not correct the settings of the input language and the output language and then input the speech again, so that the burden for correction can be reduced and usability can be improved.

Next, in a second embodiment, an example in which the translation apparatus determines whether or not the language of the input data is the input language to detect the discrepancy between the language of the input data and the input language, and swaps the settings of the input language and the output language will be described.

Hereinafter, differences from the first embodiment will be mainly described. For components having the same functions as those of the first embodiment, the same names and the same reference numerals as those of the first embodiment are given, and descriptions thereof will not be repeated.

First, the overview and configuration of the translation apparatus of the second embodiment will be described.

Figure 4:
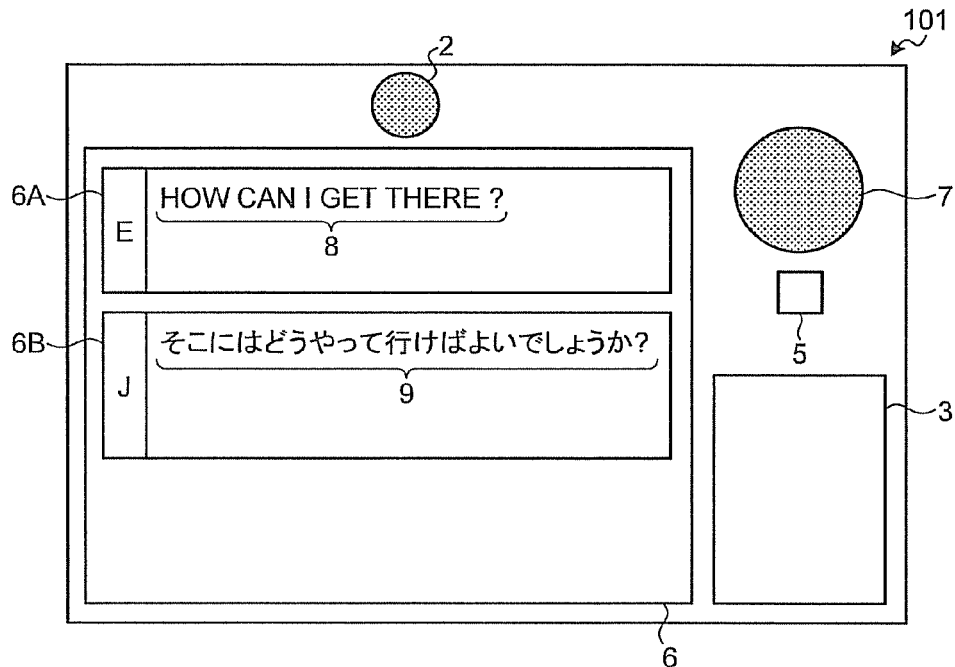
FIG. 4 is a schematic view illustrating an example of an appearance of a translation apparatus of a second embodiment.

FIG. 4 is a schematic view illustrating an example of an appearance of a translation apparatus 101 of the second embodiment. The appearance of the translation apparatus 101 is the same as that of the translation apparatus 1 of the first embodiment except for not including the wrong setting notification button 4, and thus the description thereof will not be repeated.

Figure 5:
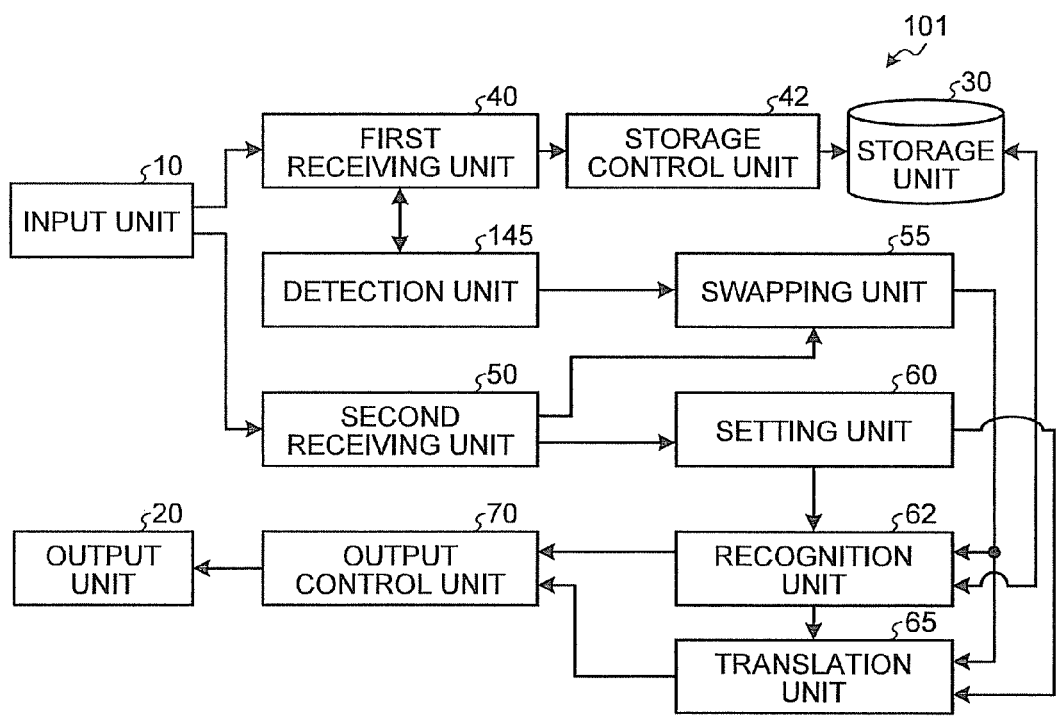
FIG. 5 is a block diagram illustrating an example of a configuration of the translation apparatus of the second embodiment.

FIG. 5 is a block diagram illustrating an example of a configuration of the translation apparatus 101 of the second embodiment. Since the translation apparatus 101 is different in processing contents of a detection unit 145 from the translation apparatus 100 of the first embodiment, the detection unit 145 will be described.

The detection unit 145 determines whether or not the language of the input data received by the first receiving unit 40 is the input language, and if the determination result indicates that the language is not the input language, the detection unit 145 detects a discrepancy between the language of the input data and the input language.

Specifically, since a predetermined amount of input data is required to determine the language, the detection unit 145 monitors the input data received by the first receiving unit 40 for a predetermined time period, and determines whether the language of the input data is the input language or the output language.

To determine the language, existing language identification methods can be used. When the input data is a speech, a language identification method disclosed in JP-A 2007-322523 (KOKAI) which uses a mixture Gaussian distribution, for example can be used. When the input data is character information, for example, a language identification method disclosed in JP-A 2006-302091 (KOKAI) which refers to language type identification elements, or the like can be used.

Next, an operation of the translation apparatus of the second embodiment will be described.

Figure 6:
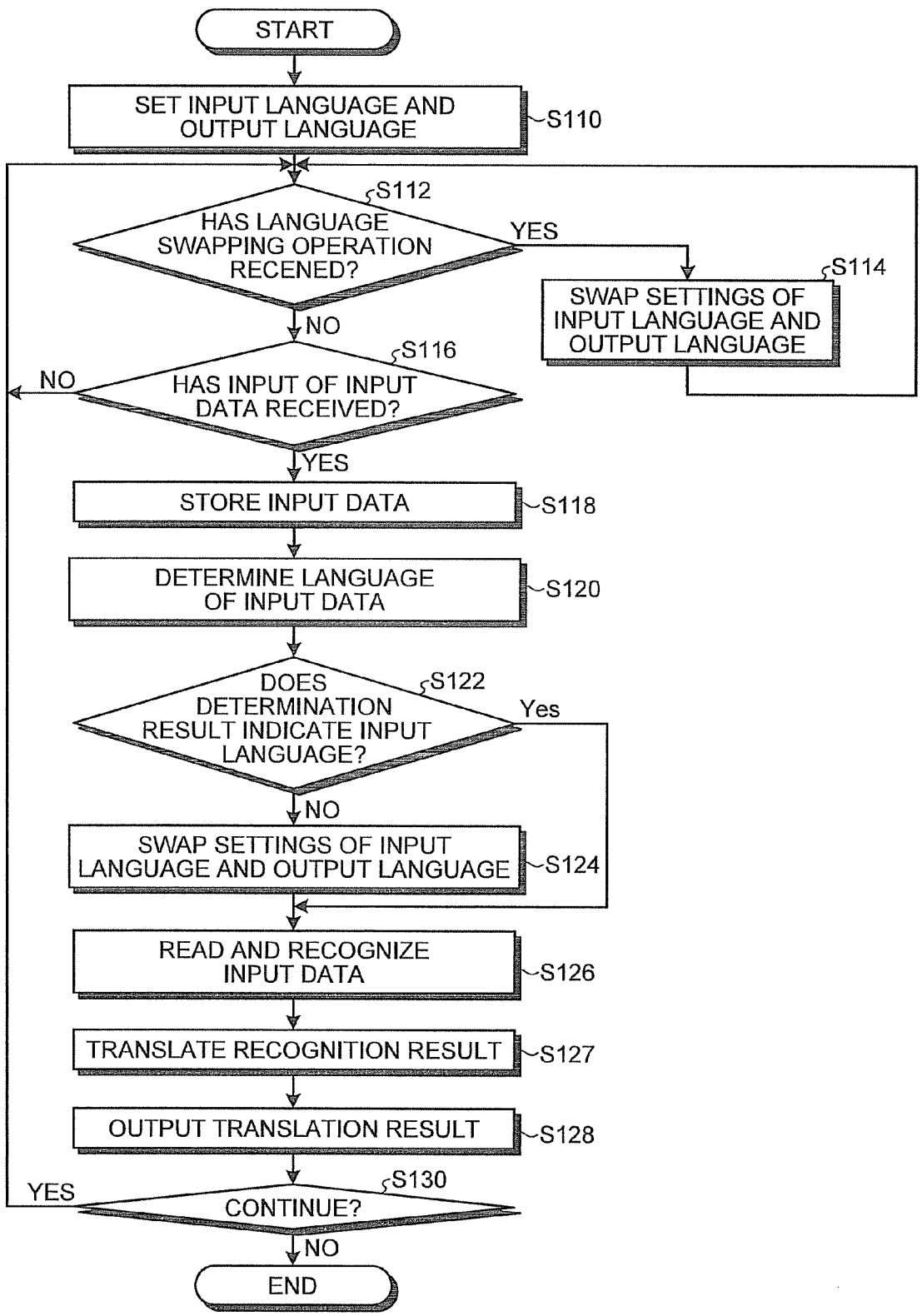
FIG. 6 is a flowchart illustrating an example of a translation processing procedure performed by the translation apparatus of the second embodiment.

FIG. 6 is a flowchart illustrating an example of a translation processing procedure performed by the translation apparatus 101 of the second embodiment.

Since the process from setting the input language and the output language to storing the input data (from step S110 to step S118) is the same as the process from step S10 to step S18 in the flowchart of FIG. 3, the description will not be repeated.

The detection unit 145 monitors the input data received by the first receiving unit 40 for a predetermined time period, and determines whether the language of the input data is the input language or not (step S120).

If the determination result indicates that the language is not the input language, (No at step S122), and a discrepancy between the language of the input data and the input language is detected by the detection unit 145, the swapping unit 55 swaps the settings of the input language and the output language (step S124).

In this case, the recognition unit 62 reads the input data stored in the storage unit 30, and recognizes the read input data in the input language swapped by the swapping unit 55 (step S126). The translation unit 65 translates the recognition result recognized in the input language swapped by the swapping unit 55 into the output language swapped by the swapping unit 55 (step S127).

On the other hand, if the determination result indicates that the language is the input language (Yes at step S122), and a discrepancy between the language of the input data and the input language is not detected by the detection unit 145, the swapping unit 55 does not perform the swapping of the settings in step S124.

In this case, the recognition unit 62 reads the input data stored in the storage unit 30, and recognizes the read input data in the original input language (step S126). The translation unit 65 translates the recognition result recognized in the original input language into the original output language (step S127).

Thereafter, since the processes after the output of the translation result (steps S128 and S130) are the same as the processes of steps S22 and S28 in FIG. 3 respectively, the descriptions will not be repeated.

As described above, in the second embodiment, if the language of the input data is determined not to be the input language, the settings of the input language and the output language are swapped, the stored input data is read, and the read input data is recognized in the input language swapped by the swapping unit and translated into the output language swapped by the swapping unit. Therefore, according to the second embodiment, even when the setting of the input language is wrong, the user need not correct the settings of the input language and the output language and then input a speech again, and further, the user need not perform any operation, so that the burden for correction can be further reduced and usability can be further improved.

Next, in a third embodiment, an example in which the translation apparatus uses not only the determination result whether or not the language of the input data is the input language, but also the reliability of the determination result to detect the discrepancy between the language of the input data and the input language, and swaps the settings of the input language and the output language will be described.

Hereinafter, differences from the second embodiment will be mainly described. For components having the same functions as those of the second embodiment, the same names and the same reference numerals as those of the second embodiment are given, and descriptions thereof will not be repeated.

First, the overview and configuration of the translation apparatus of the third embodiment will be described. The appearance of the translation apparatus of the third embodiment is the same as that of the translation apparatus 101 of the second embodiment, and thus the description will not be repeated.

Figure 7:
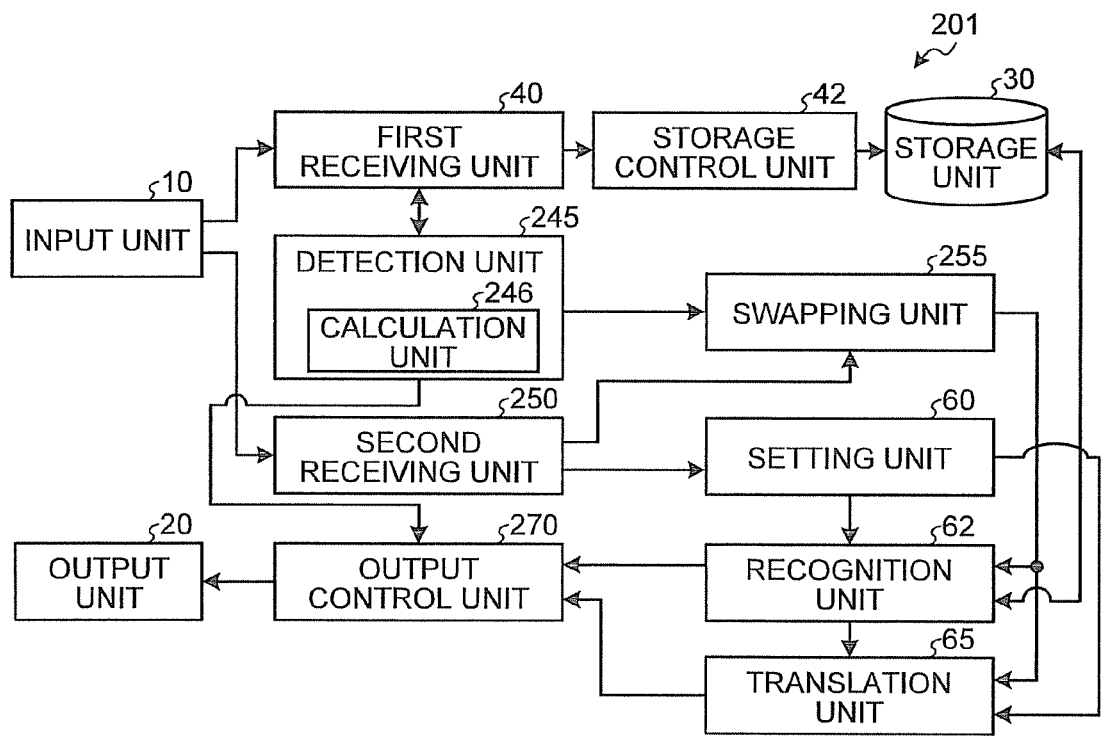
FIG. 7 is a block diagram illustrating an example of a configuration of a translation apparatus of a third embodiment.

FIG. 7 is a block diagram illustrating an example of a configuration of a translation apparatus 201 of the third embodiment. In the translation apparatus 201, since the translation apparatus 201 is different from the translation apparatus 101 of the second embodiment in that a detection unit 245 includes a calculation unit 246, and in processing contents of the detection unit 245, a second receiving unit 250, a swapping unit 255, and an output control unit 270, these functional units will be described.

The detection unit 245 determines whether or not the language of the input data received by the first receiving unit 40 is the input language, and if the determination result indicates that the language of the input data is not the input language, and the reliability of the determination result calculated by the calculation unit 246 to be described below is equal to or greater than a first threshold value, the detection unit 245 detects a discrepancy between the language of the input data and the input language.

If the determination result indicates that the language of the input data is not the input language, and a condition that the reliability is smaller than the first threshold value and equal to or greater than a second threshold value which is smaller than the first threshold value is satisfied, the detection unit 245 also detects a discrepancy between the language of the input data and the input language. In this case, since the reliability of the determination result is not so high, a user check is performed by the output control unit 270 to be described below before a swapping unit 225 swaps the settings of the input language and the output language.

The calculation unit 246 calculates the reliability of the determination result by the detection unit 245. To calculate the reliability, an existing calculation method can be used. When the input data is a speech, a method for calculating likelihood disclosed in JP-A 07-230294 (KOKAI), for example can be used. When the input data is character information, for example, the reliability can be calculated by the formula (1) below while assuming an appearance rate of recognized characters disclosed in JP-A 10-177623 (KOKAI) to be scores $l_i$ and $l_o$ corresponding to the input language and the output language, respectively.

$$\text{Reliability} = l_i/(l_i + l_o) \quad (1)$$

If the determination result indicates that the language of the input data is not the input language, and a condition that the reliability is smaller than the first threshold value and equal to or greater than a second threshold value which is smaller than the first threshold value is satisfied, so that the detection unit 245 detects the discrepancy, the output control unit 270 causes the output unit 20 to perform an output for checking if retranslation should be done at a predetermined timing after the input data has been input.

"A predetermined timing after the input data has been input" may be any timing between when the input data is input and when an input of the next input data is started. For example, the timing may be set to the timing after the input data has been input or after the translation result is output, or may be selected by a user may select. Or, for example, when the detection unit 245 detects a discrepancy between the language of the input data and the input language after the input data has been input, the timing may be the timing when the detection unit 245 detects the discrepancy.

In the third embodiment, the output control unit 270 outputs a retranslation check message to the output unit 20 in both of the input language and the output language, or not using language.

Figure 8:
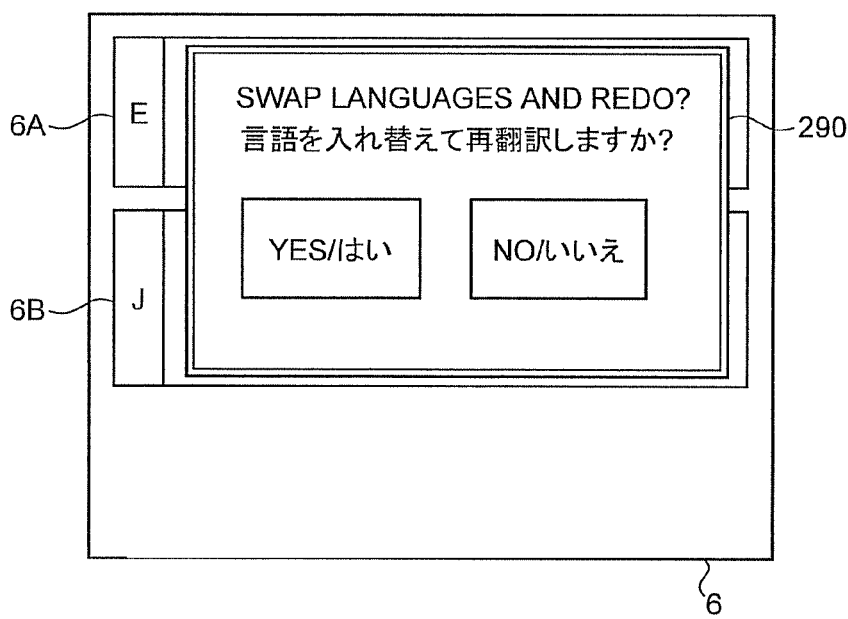
FIG. 8 is a view illustrating an example of an output format for checking if retranslation should be done in the third embodiment.

For example, the output control unit 270 causes the display 6 to display a retranslation check screen 290 on which both English and Japanese are displayed as illustrated in FIG. 8, or causes the speaker 7 to output a retranslation check speech in English and Japanese.

Or, the output control unit 270 may cause the display 6 to display a specific symbol (for example, a non-language mark or symbol such as "o", "x", and the like), or may cause the speaker 7 to audio-output a specific melody.

The second receiving unit 250 receives an input of a retranslation instruction operation for instructing retranslation through various buttons or a keyboard not illustrated in the figures.

If the above conditions are satisfied, and thus the detection unit 245 detects discrepancy, and if the second receiving unit 250 receives the input of the retranslation instruction operation, the swapping unit 255 swaps the settings of the input language and the output language.

Next, an operation of the translation apparatus of the third embodiment will be described.

Figure 9:
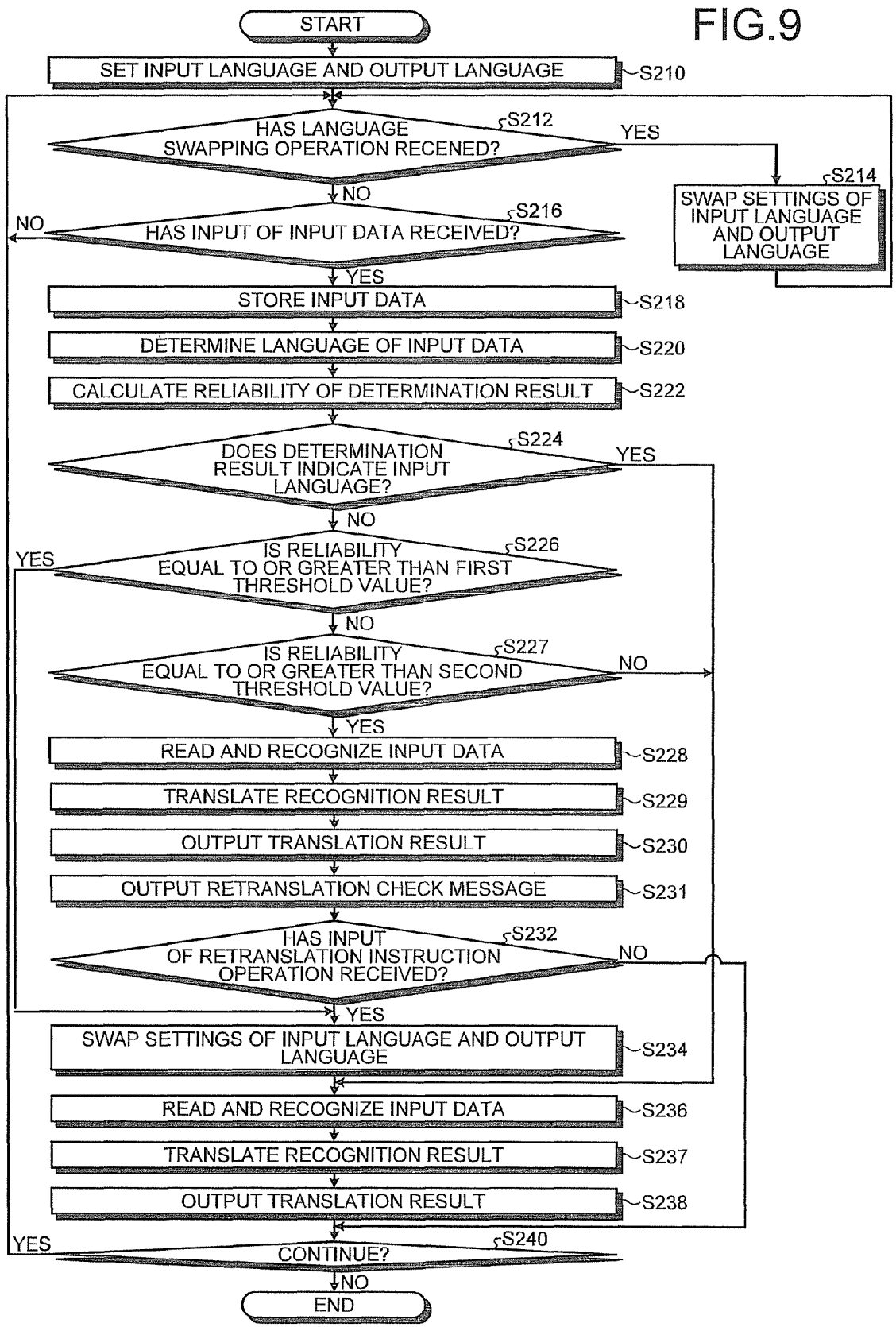
FIG. 9 is a flowchart illustrating an example of a translation processing procedure performed by the translation apparatus of the third embodiment.

FIG. 9 is a flowchart illustrating an example of a translation processing procedure performed by the translation apparatus 201 of the third embodiment. In the example illustrated in FIG. 9, although a case in which the check whether retranslation should be done is performed after the translation result is output, the timing of the check whether retranslation should be done is not limited to this.

Since the process from setting the input language and the output language to determining the language of the input data (from step S210 to step S220) is the same as the process from step S110 to step S120 in the flowchart of FIG. 6, the description will not be repeated.

The calculation unit 246 calculates the reliability of the determination result by the detection unit 245 (step S222).

The detection unit 245 checks whether the determination result indicates that the language of the input data is the input language or not (step S224). If the determination result indicates that the language of the input data is the input language (Yes at step S224), the swapping of the settings of the input language and the output language therebetween in step S234 is not performed, the recognition unit 62 recognizes the input data read from the storage unit 30 in the original input language (step S236), and the translation unit 65 translates the recognition result into the original output language (step S237).

If the determination result indicates that the language of the input data is not the input language (No at step S224), the detection unit 245 checks whether the reliability is equal to or greater than the first threshold value (step S226). If the reliability is equal to or greater than the first threshold value (Yes at step S226), the swapping unit 255 swaps the settings of the input language and the output language (step S234), the recognition unit 62 recognizes the input data read from the storage unit 30 in the input language swapped by the swapping unit (step S236), and the translation unit 65 translates the recognition result into the output language swapped by the swapping unit (step S237).

If the reliability is smaller than the first threshold value (No at step S226), the detection unit 245 checks whether the reliability is equal to or greater than the second threshold value which is smaller than the first threshold value (step S227). If the reliability is smaller than the second threshold value (No at step S227), the determination result is identified as a wrong determination because the reliability is low. Therefore, the swapping of the settings of the input language and the output language in step S234 is not performed, the recognition unit 62 recognizes the input data read from the storage unit 30 in the original input language (step S236), and the translation unit 65 translates the recognition result into the original output language (step S237).

If the reliability is equal to or greater than the second threshold value (Yes at step S227), the recognition unit 62 recognizes the input data read from the storage unit 30 in the original input language (step S228), and the translation unit 65 translates the recognition result into the original output language (step S229).

The output control unit 270 causes the output unit 20 to output the translation result (step S230).

The output control unit 270 causes the output unit 20 to perform an output for checking if retranslation should be done (step S231).

The second receiving unit 250 checks whether or not the input of the retranslation instruction operation is performed (step S232).

If the input of the retranslation instruction operation is received by the second receiving unit 250 (Yes at step S232), the swapping unit 255 swaps the settings of the input language and the output language (step S234).

On the other hand, if the input of the retranslation instruction operation is not received (No at step S232), the second receiving unit 250 checks the input of the end operation to determine whether or not the process should be continued (step S240).

The recognition unit 62 recognizes the input data read from the storage unit 30 in the input language swapped by the swapping unit 255 (step S236), and the translation unit 65 translates the recognition result into the output language swapped by the swapping unit 255 (step S237).

The output control unit 270 causes the output unit 20 to output the translation result (step S238).

Thereafter, the check whether the process should be continued (step S240) is the same as the process of step S130 in FIG. 6, the description will not be repeated.

As described above, in the third embodiment, in addition to the determination result whether or not the language of the input data is the input language, the reliability of the determination result is used to detect the discrepancy between the language of the input data and the input language. If the reliability of the determination, result indicating that the language of the input data is not the input language is high, the settings of the input language and the output language are swapped without user's approval, and if the reliability of the determination result indicating that the language of the input data is not the input language is not so high, the settings of the input language and the output language are swapped with user's approval.

Therefore, according to the third embodiment, the accuracy of the swapping of the settings of the input language and the output language can be increased, so that the burden for correction can be further reduced and usability can be further improved.

Also, in the third embodiment, since the check whether retranslation should be done is performed after the input data has been input, a user can input the input data without being bothered by checking whether retranslation should be done, so that an event in which the input of the input data is finished incompletely is prevented. Therefore, according to the third embodiment, a meaningless retranslation of incomplete input data caused by incompletely finished input can be prevented.

Also, in the third embodiment, since the check whether retranslation should be done is performed in both of the input language and the output language, or is performed in non-language, even when the discrepancy between the language of the input data and the input language is wrongly detected, a user can understand that the check whether retranslation should be done is required.

In the third embodiment, although an example in which two threshold values are used is described, it is also possible to use one threshold value to determine whether the swapping of the settings of the input language and the output language is performed without user check or the swapping of the settings of the input language and the output language is not performed. Or, it is also possible to determine whether the swapping of the settings of the input language and the output language is performed with user check without exception or the swapping of the settings of the input language and the output language is not performed.

In the second and third embodiments, whether the language of the input data is the input language or not is determined by monitoring the input data for a predetermined time period. As the monitoring time period is long, the start of the translation processing is delayed, and thus the monitoring time is desired to be short. However, if the monitoring time is set to short, the reliability of the determination result is lowered.

Therefore, in the fourth embodiment, first, the translation apparatus performs a first determination to determine whether or not the language of the input data is the input language in a first period, which is a predetermined period after the start of the input of the input data and until the translation is started, to detect a discrepancy between the language of the input data and the input language. If the reliability of the first determination is not so high, subsequently, the translation apparatus performs a second determination to determine whether or not the language of the input data is the input language in a second period, which is longer than the first period, to detect the discrepancy between the language of the input data and the input language. An example to detect the discrepancy in the above way will be described.

Hereinafter, differences from the third embodiment will be mainly described. For components having the same functions as those of the third embodiment, the same names and the same reference numerals as those of the third embodiment are given, and descriptions thereof will not be repeated.

First, the overview and configuration of the translation apparatus of the fourth embodiment will be described. The appearance of the translation apparatus of the fourth embodiment is the same as that of the translation apparatus 201 of the third embodiment, and thus the description will not be repeated.

Figure 10:
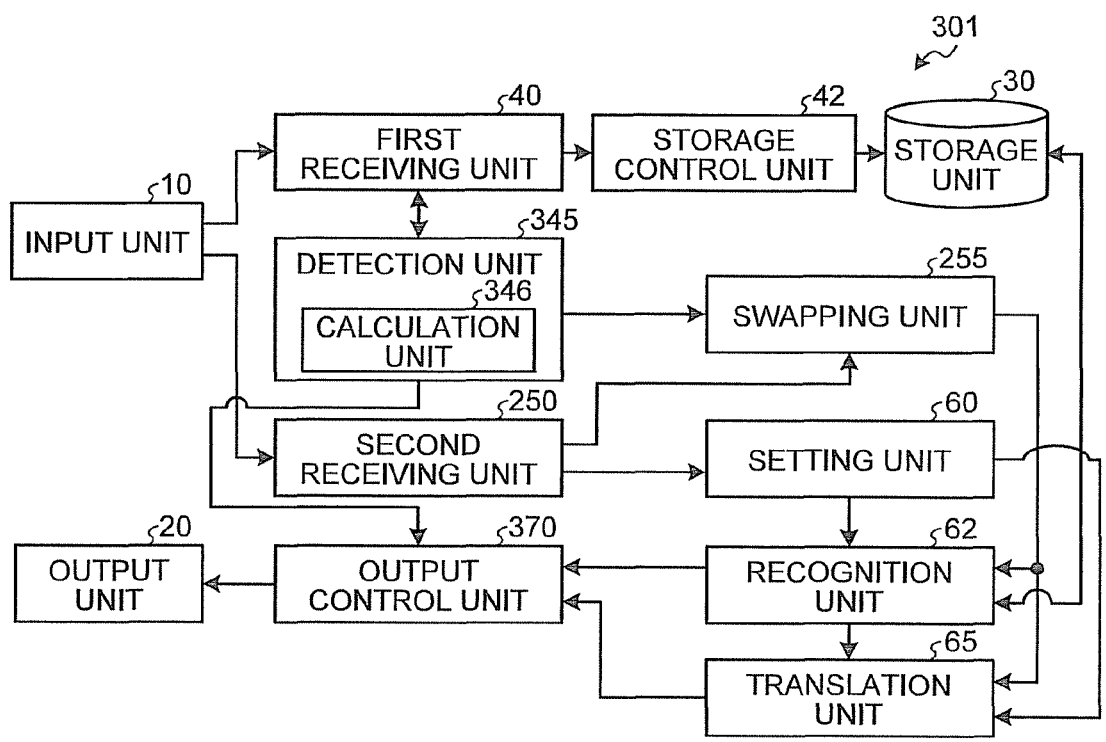
FIG. 10 is a block diagram illustrating an example of a configuration of a translation apparatus of a fourth embodiment.

FIG. 10 is a block diagram illustrating an example of a configuration of a translation apparatus 301 of the fourth embodiment. Since the translation apparatus 301 is different from the translation apparatus 201 of the third embodiment in processing contents of a detection unit 345, a calculation unit 346, and an output control unit 370 in the translation apparatus 301, these functional units will be described.

The detection unit 345 performs a first determination in a first period and also performs a second determination in a second period, which is longer than the first period, to determine whether or not the language of the input data received by the first receiving unit 40 is the input language. For example, the second period may be a period after the start of the input of the input data until the finish of the translation.

If a first determination result of the first determination indicates that the language of the input data is not the input language, and a first reliability of the first determination result calculated by the calculation unit 346 to be described below is equal to or greater than a first threshold value, the detection unit 345 detects a discrepancy between the language of the input data and the input language.

Even if the first determination result indicates that the language of the input data is not the input language, the first reliability is smaller than the first threshold value and equal to or greater than a second threshold value which is smaller than the first threshold value, if the second determination result of the second determination also indicates that the language of the input data is not the input language, and a second reliability of the second determination result calculated by the calculation unit 346 to be described below is equal to or greater than a third threshold value, the detection unit 345 detects a discrepancy between the language of the input data and the input language. The third threshold value may be the same or not the same as the first threshold value.

Furthermore, if a condition in which the first determination result indicates that the language of the input data is not the input language, and the first reliability is smaller than the first threshold value and equal to or greater than the second threshold value which is smaller than the first threshold value, and further the second determination result indicates that the language of the input data is not the input language, and the second reliability is smaller than the third threshold value and equal to or greater than a fourth threshold value which is smaller than the third threshold value is satisfied, the detection unit 345 also detects a discrepancy between the language of the input data and the input language. In this case, since the reliability of the determination result is not so high, a user check is performed by the output control unit 370 to be described below before the swapping unit 225 swaps the settings of the input language and the output language.

The calculation unit 346 calculates the first reliability of the first determination result and the second reliability of the second determination result.

If a condition in which the first determination result indicates that the language of the input data is not the input language, and the first reliability is smaller than the first threshold value and equal to or greater than the second threshold value which is smaller than the first threshold value, and further the second determination result indicates that the language of the input data is not the input language, and the second reliability is smaller than the third threshold value and equal to or greater than the fourth threshold value which is smaller than the third threshold value is satisfied, so that the detection unit 345 detects discrepancy, the output control unit 370 causes the output unit 20 to perform an output for checking if retranslation should be done at a predetermined timing after the input data has been input.

Next, an operation of the translation apparatus of the fourth embodiment will be described.

Figure 11:
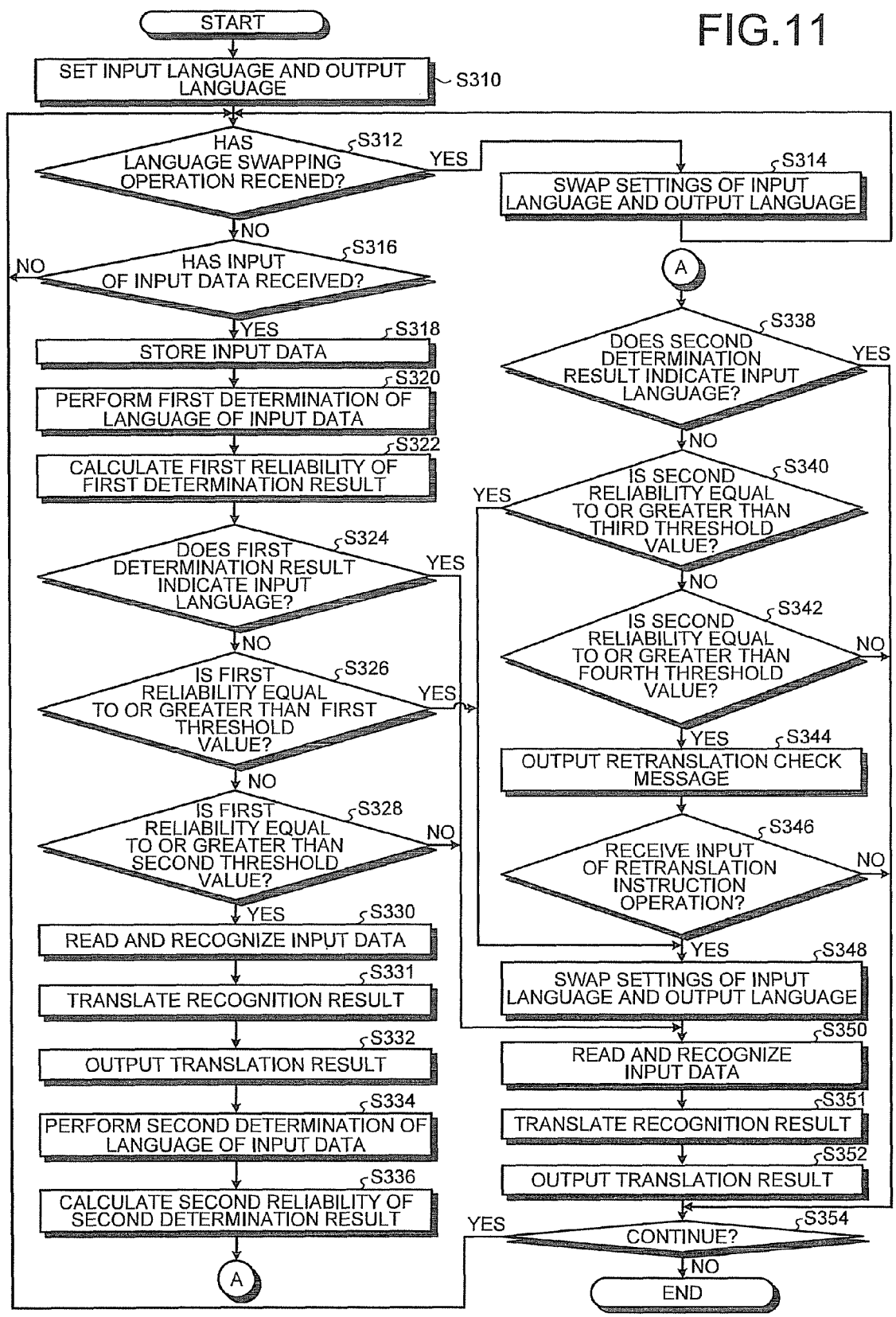
FIG. 11 is a flowchart illustrating an example of a translation processing procedure performed by the translation apparatus of the fourth embodiment.

FIG. 11 is a flowchart illustrating an example of a translation processing procedure performed by the translation apparatus 301 of the fourth embodiment. In the example illustrated in FIG. 11, although a case in which a period after the start of the input of the input data until the start of the translation is assumed to be a first period and a period after the start of the input of the input data until the finish of the translation is assumed to be a second period will be described as an example, the first period and the second period are not limited to these.

Since the process from setting the input language and the output language to storing the input data (from step S310 to step S318) is the same as the process from step S210 to step S218 in the flowchart of FIG. 9, the description will not be repeated.

The detection unit 345 uses the input data received by the first receiving unit 40 within the first period to perform the first determination to determine whether or not the language of the input data is the input language (step S320).

The calculation unit 346 calculates the first reliability of the first determination result by the detection unit 345 (step S322).

The detection unit 345 checks whether the first determination result indicates the input language or not (step S324). If the first determination result indicates that the language of the input data is the input language (Yes at step S324), the swapping of the settings of the input language and the output language in step S348 is not performed, the recognition unit 62 recognizes the input data read from the storage unit 30 in the original input language (step S350), and the translation unit 65 translates the recognition result into the original output language (step S351).

If the first determination result indicates that the language of the input data is not the input language (No at step S324), the detection unit 345 checks whether the first reliability is greater than or equal to the first threshold value (step S326). If the first reliability is equal to or greater than the first threshold value (Yes at step S326), the swapping unit 255 swaps the settings of the input language and the output language (step S348), the recognition unit 62 recognizes the input data read from the storage unit 30 in the input language swapped by the swapping unit 255 (step S350), and the translation unit 65 translates the recognition result into the output language swapped by the swapping unit 255 (step S351).

If the first reliability is smaller than the first threshold value (No at step S326), the detection unit 345 checks whether the first reliability is equal to or greater than the second threshold value which is smaller than the first threshold value (step S328). If the first reliability is smaller than the second threshold value (No at step S328), the first determination result is identified as a wrong determination because the first reliability is low. Therefore, the swapping of the settings of the input language and the output language in step S348 is not performed, the recognition unit 62 recognizes the input data read from the storage unit 30 in the original input language (step S350), and the translation unit 65 translates the recognition result into the original output language (step S351).

If the first reliability is equal to or greater than the second threshold value (Yes at step S328), the recognition unit 62 recognizes the input data read from the storage unit 30 in the original input language (step S330), and the translation unit 65 translates the recognition result into the original output language (step S331).

The output control unit 370 causes the output unit 20 to output the translation result (step S332).

The detection unit 345 uses the input data received by the first receiving unit 40 within the second period to perform the second determination to determine whether or not the language of the input data is the input language (step S334).

The calculation unit 346 calculates the second reliability of the second determination result by the detection unit 345 (step S336).

The detection unit 345 checks whether the second determination result indicates that the language of the input data is the input language or not (step S338). If the second determination result indicates the input language (Yes at step S338), the second receiving unit 250 checks the input of the end operation to determine whether or not the process should be continued (step S354).

If the second determination result indicates that the language of the input data is not the input language (No at step S338), the detection unit 345 checks whether the second reliability is equal to or greater than the third threshold value (step S340). If the second reliability is equal to or greater than the third threshold value (Yes at step S340), the swapping unit 255 swaps the settings of the input language and the output language (step S348), the recognition unit 62 recognizes the input data read from the storage unit 30 in the input language swapped by the swapping unit 255 (step S350), and the translation unit 65 translates the recognition result into the output language swapped by the swapping unit 255 (step S351).

If the second reliability is smaller than the third threshold value (No at step S340), the detection unit 345 checks whether the second reliability is equal to or greater than the fourth threshold value which is smaller than the third threshold value (step S342). If the second reliability is smaller than the fourth threshold value (No at step S342), the second determination result is identified as a wrong determination because the second reliability is low. In this case, the second receiving unit 250 checks the input of the end operation and determines whether the process should be continued or not (at step S354).

If the second reliability is equal to or greater than the fourth threshold value (Yes at step S342), the output control unit 370 causes the output unit 20 to perform an output for checking if retranslation should be done (step S344).

The second receiving unit 250 checks whether or not the input of the retranslation instruction operation is performed (step S346).

If the input of the retranslation instruction operation is received by the second receiving unit 250 (Yes at step S346), the swapping unit 255 swaps the settings of the input language and the output language (step S348).

On the other hand, if the input of the retranslation instruction operation is not received (No at step S346), the second receiving unit 250 checks the input of the end operation to determine whether or not the process should be continued (step S354).

The recognition unit 62 recognizes the input data read from the storage unit 30 in the input language swapped by the swapping unit 255 (step S350), and the translation unit 65 translates the recognition result into the output language swapped by the swapping unit 255 (step S351).

The output control unit 370 causes the output unit 20 to output the translation result (step S352).

Thereafter, the check whether the process should be continued (step S354) is the same as the process of step S240 in FIG. 9, the description will not be repeated.

As described above, in the fourth embodiment, the determination to determine whether or not the language of the input data is the input language is performed in two separate phases including the first period which is a predetermined period after the start of the input of the input data until the start of the translation and the second period which is longer than the first period, to detect a discrepancy between the language of the input, data and the input language is detected by using these determination results.

Therefore, according to the fourth embodiment, the delay for starting the translation operation can be suppressed while the accuracy of the swapping of the settings of the input language and the output language is increased, so that the burden for correction can be further reduced and usability can be further improved.

The present invention is not limited to the above embodiments as they are, components can be modified and embodied without departing from the scope of the invention when implementing. Also, various inventions can be formed by properly combining a plurality of components disclosed in the above embodiments. For example, some components may be removed from all the components shown in the embodiments. Furthermore, components of different embodiments may be appropriately combined with each other.

While a message for checking whether retranslation should be done is output in the third and fourth embodiments described above, the message for checking whether retranslation should be done may be also output in the first and second embodiments.

In other words, in the first and second embodiments, if a discrepancy between the language of the input data and the input language is detected, the swapping of the settings of the input language and the output language may not be performed immediately, but may be performed after the check whether retranslation should be done is performed and if approved by the user.

With the above-described configuration, since whether retranslation should be done is checked by the user, even when the user incorrectly operates the wrong setting notification button or a false detection in the detection unit occurs, such problems can be recovered, so that the usability can be further improved.

In the first and second embodiment, the timing when outputting the message for checking whether retranslation should be done and an output format for checking whether retranslation should be done may be the same as those of the third and fourth embodiment.

In the third embodiment, even when a discrepancy between the language of the input data and the input language is detected before the input of the input data is completed, the message for checking whether retranslation should be done is output after the input of the input data is completed. However, a warning message or the like may be displayed as long as the display does not disturb the user inputting data. Much the same is true on outputting the message for checking whether retranslation should be done in the first and second embodiments. Also, much the same is true on outputting the message for checking whether retranslation should be done before the translation is completed in the fourth embodiment.

For example, when a discrepancy between the language of the input data and the input language is detected, a symbol indicating that the discrepancy between the language of the input data and the input language is detected may be displayed in a corner of the display 6, or a beep sound may be audio-output from the speaker 7.

Figure 12:
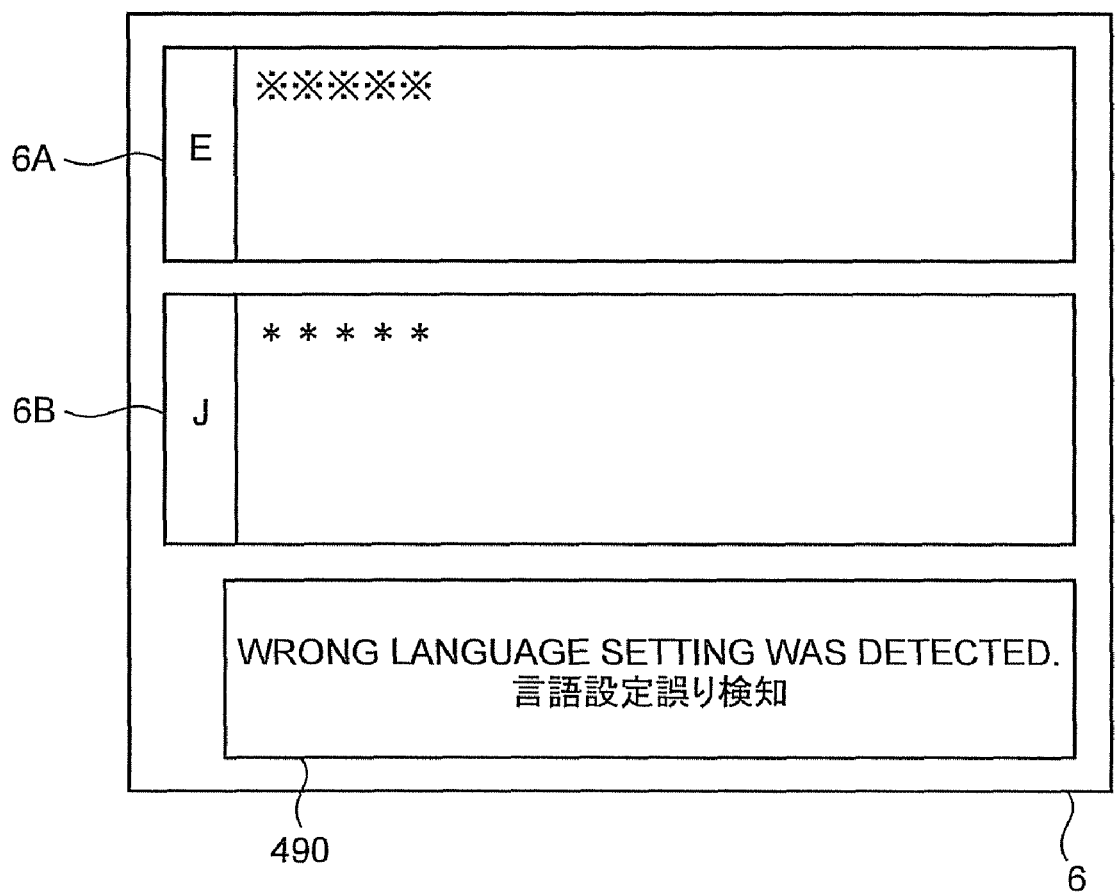
FIG. 12 is a view illustrating an example of a warning output format in a modified embodiment.

Also, for example, when a discrepancy between the language of the input data and the input language is detected, a warning display 490 may be displayed on the display 6 in such a manner that the warning display 490 does not overlap the first display area 6A and the second display area 6B on which the recognition result and the translation result are respectively displayed as illustrated in FIG. 12.

In each of the above embodiments, to avoid a case in which translation is not finished because the completion of the input of the input data is not detected, it is possible to stop the translation and output a warning massage if an completion of the input of the input data is not detected within a predetermined time period after the start of the input of the input data is detected.

Each of the translation apparatuses 1, 101, 201, 301 of each of the above embodiments has a hardware configuration including a control device such as Central Processing Unit (CPU), storage devices such as Read Only Memory (ROM), Random Access Memory (RAM), HDD, an optical disk, and a memory card, a speech input device such as a microphone, a display device such as a liquid crystal display, an input devices such as a touch panel and operation buttons, a audio output device such as a speaker, and the like.

A translation program executed in the translation apparatuses 1, 101, 201, 301 of the above embodiments is provided as a computer program product recorded in a computer-readable storage medium such as CD-ROM, a flexible disk (FD), CD-R, Digital Versatile Disk (DVD), and the like, as a file having an installable format or an executable format.

The translation program executed in the translation apparatuses 1, 101, 201, 301 of the above embodiments may be provided as previously incorporated in the ROM.

The translation program executed in the translation apparatuses 1, 101, 201, 301 of the above embodiments has a unit configuration including the above-described units (the first receiving unit, the storage control unit, the detection unit, the second receiving unit, the swapping unit, the setting unit, the translation unit, the output control unit, and the like). In the actual hardware, the CPU (processor) reads the translation program from the storage medium and executes the translation program, so that the above units are loaded onto a main memory unit so that the first receiving unit, the storage control unit, the detection unit, the second receiving unit, the swapping unit, the setting unit, the translation unit, the output control unit, and the like are generated on the main memory unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A translation apparatus comprising:
a setting unit configured to set an input language and an output language;
a first receiving unit configured to receive input data in a language, which is speech or character information;
a storage unit configured to store the input data;
a detection unit configured to detect a discrepancy between the input language and the language of the input data;
a swapping unit configured to swap the settings of the input language and the output language if the discrepancy is detected;
a reading unit configured to read the input data from the storage unit;
a recognition unit configured to recognize the input data from the storage unit in the input language set by the setting unit if the discrepancy is not detected, and recognize the input data from the storage unit in the input language swapped by the swapping unit if the discrepancy is detected;
a translation unit configured to translate a recognition result recognized in the input language set by the setting unit into the output language set by the setting unit if the discrepancy is not detected, and translate a recognition result recognized in the input language swapped by the swapping unit into the output language swapped by the swapping unit if the discrepancy is detected
a second receiving unit configured to receive an input of a retranslation instruction operation which instructs a retranslation; and
an output unit configured to output a translation result;

wherein the output unit outputs a retranslation check message at a predetermined timing after completion of the input of the input data if the detection unit detects the discrepancy, the swapping unit swaps the settings of the input language and the output language if the detection unit detects the discrepancy and the second receiving unit receives the input of the retranslation instruction operation, the reading unit reads the input data from the storage unit again with the swapping as a start, the recognition unit recognizes the input data from the storage unit in the language set by the setting unit, and recognizes the input data from the storage unit again in the input language swapped by the swapping unit, and the translation unit translates the recognition result recognized in the input language set by the setting unit into the output language set by the setting unit, and translates the recognition result recognized in the input language swapped by the swapping unit into the output language swapped by the swapping unit.

2. The translation apparatus according to claim 1, wherein the detection unit detects the discrepancy between the language of the input data and the input language by detecting an input of a wrong setting notification operation which notifies of a wrong setting of the input language.

3. The translation apparatus according to claim 1, wherein the detection unit determines whether the language of the input data and the input language are the same and detects the discrepancy between the language of the input data and the input language if a determination result indicates that the language of the input data and the input language are not the same.

4. The translation apparatus according to claim 3, further comprising:

a calculation unit configured to calculate a reliability of the determination result, wherein the detection unit detects the discrepancy between the language of the input data and the input language if the determination result indicates that the language of the input data and the input language are not the same and the reliability is equal to or greater than a first threshold value.

5. The translation apparatus according to claim 4, further comprising:

the second receiving unit configured to receive an input of a retranslation instruction operation which instructs a retranslation; and the output unit configured to output a translation result, wherein the detection unit also detects the discrepancy between the language of the input data and the input language if a condition that the determination result indicates that the language of the input data and the input language are not the same and the reliability is smaller than the first threshold value and equal to or greater than a second threshold value which is smaller than the first threshold value is satisfied, the output unit outputs a retranslation check message at a predetermined timing after completion of the input of the input data if the detection unit detects the discrepancy because the condition is satisfied, the swapping unit swaps the settings of the input language and the output language if the detection unit detects the discrepancy because the condition is satisfied and the second receiving unit receives the input of the retranslation instruction operation, the reading unit reads the input data from the storage unit again with the swapping as a start, the recognition unit recognizes the input data from the storage unit in the language set by the setting unit, and recognizes the input data read from the storage unit again in the input language swapped by the swapping unit, and the translation unit translates the recognition result recognized in the input language set by the setting unit into the output language set by the setting unit, and translates the recognition result recognized in the input language swapped by the swapping unit into the output language swapped by the swapping unit.

6. The translation apparatus according to claim 3, further comprising:

a calculation unit configured to calculate a first reliability of a first determination result which is the determination result in a first period which is a predetermined period until the translation is started by the translation unit, and a second reliability of a second determination result which is the determination result in a second period which is longer than the first period, wherein the detection unit detects the discrepancy between the language of the input data and the input language if the first determination result indicates that the language of the input data and the input language are not the same the first reliability is equal to or greater than a first threshold value, or if the first determination result indicates that the language of the input data and the input language are not the same and the first reliability is smaller than the first threshold value and equal to or greater than a second threshold value which is smaller than the first threshold value, furthermore the second determination result indicates that the language of the input data and the input language are not the same, and the second reliability is equal to or greater than a third threshold value.

7. The translation apparatus according to claim 6, further comprising:

the second receiving unit configured to receive an input of a retranslation instruction operation which instructs a retranslation; and the output unit configured to output a translation result, wherein the detection unit also detects the discrepancy between the language of the input data and the input language if a condition that the first determination result indicates that the language of the input data and the input language are not the same, the first reliability is smaller than the first threshold value and equal to or greater than the second threshold value which is smaller than the first threshold value, furthermore the second determination result indicates that the language of the input data and the input language are not the same, and the second reliability is smaller than the third threshold value and equal to or greater than a fourth threshold value which is smaller than the third threshold value is satisfied, the output unit outputs a retranslation check message at a predetermined timing after completion of the input of the input data if the detection unit detects the discrepancy because the condition is satisfied, the swapping unit swaps the settings of the input language and the output language if the detection unit detects the discrepancy because the condition is satisfied and the second receiving unit receives the input of the retranslation instruction operation, the reading unit reads the input data from the storage unit again with the swapping as a start, the recognition unit recognizes the input data from the storage unit in the language set by the setting unit, and recognizes the input data from the storage unit again in the input language swapped by the swapping unit, and the translation unit translates the recognition result recognized in the input language set by the setting unit into the output language set by the setting unit, and translates the recognition result recognized in the input language swapped by the swapping unit into the output language swapped by the swapping unit.

8. The translation apparatus according to claim 1, wherein the output unit outputs a retranslation check message in both of the input language and the output language, or not using language.

9. A translation method comprising:

setting an input language and an output language to predetermined languages, respectively;

receiving input data in a language, which is speech or character information;

storing the input data into a storage unit;

detecting a discrepancy between the input language and the language of the input data;

swapping the settings of the input language and the output language if the discrepancy is detected;

reading the input data stored in the storage unit;

recognizing the input data from the storage unit in the input language set at the setting if the discrepancy is not detected, and recognizing the input data from the storage unit in the input language swapped at the swapping if the discrepancy is detected; and translating a recognition result recognized in the input language set at the setting into the output language set at the setting if the discrepancy is not detected, translating the recognition result recognized in the input language swapped at the swapping into the output language swapped at the swapping if the discrepancy is detected;

outputting a translation result;

outputting a retranslation check message at a predetermined timing after completion of inputting the input data if the discrepancy is detected;

receiving an input of a retranslation instruction operation which instructs a retranslation;

swapping the settings of the input language and the output language if the discrepancy is detected and the input of the retranslation instruction operation is received;

reading the input data from the storage unit again with the swapping as a start, recognizing the input data from the storage unit in the language set by the setting, and recognizing the input data from the storage unit again in the input language swapped by the swapping; and translating the recognition result recognized in the input language set by the setting into the output language set by the setting and translating the recognition result recognized in the input language swapped by the swapping into the output language swapped by the swapping.

10. A computer program product having a non transitory computer readable medium including programmed instructions that, when executed by a computer, cause the computer to perform:

setting an input language and an output language to predetermined languages, respectively;

receiving input data in a language, which is speech or character information;

storing the input data into a storage unit;

detecting a discrepancy between the input language and the language of the input data;

swapping the settings of the input language and the output language if the discrepancy is detected;

reading the input data stored in the storage unit;

recognizing the input data from the storage unit in the input language set at the setting if the discrepancy is not detected, and recognizing the input data from the storage unit in the input language swapped at the swapping if the discrepancy is detected;

translating a recognition result recognized in the input language set at the setting into the output language set at the setting if the discrepancy is not detected, and translating the recognition result recognized in the input language swapped at the swapping into a output language swapped at the swapping if discrepancy is detected;

outputting a translation result;

outputting a retranslation check message at a predetermined timing after completion of inputting the input data if the discrepancy is detected;

receiving an input of a retranslation instruction operation which instructs a retranslation;

swapping the settings of the input language and the output language if the discrepancy is detected and the input of the retranslation instruction operation is received;

reading the input data from the storage unit again with the swapping as a start, recognizing the input data from the storage unit in the language set by the setting, and recognizing the input data from the storage unit again in the input language swapped by the swapping; and translating the recognition result recognized in the input language set by the setting into the output language set by the setting and translating the recognition result recognized in the input language swapped by the swapping into the output language swapped by the swapping.

\* \* \* \* \*